(12) United States Patent
Horie

(10) Patent No.: US 9,768,640 B2
(45) Date of Patent: Sep. 19, 2017

(54) SWITCHING THE POWER SUPPLY SOURCE OF SYSTEM TO ONE OF A FIRST BATTERY IN ELECTRONIC APPARATUS AND A SECOND BATTERY IN EXTENSION DETACHABLE AND ATTACHABLE TO THE APPARATUS

(71) Applicant: KABUSHIKI KAISHA TOSHIBA, Minato-ku, Tokyo (JP)

(72) Inventor: Yutaka Horie, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/858,488

(22) Filed: Sep. 18, 2015

(65) Prior Publication Data

US 2016/0179182 A1 Jun. 23, 2016

Related U.S. Application Data

(60) Provisional application No. 62/094,755, filed on Dec. 19, 2014.

(51) Int. Cl.
| | |
|---|---|
| *G06F 1/32* | (2006.01) |
| *G06F 1/26* | (2006.01) |
| *H02J 9/00* | (2006.01) |
| *H02J 1/00* | (2006.01) |
| *G06F 1/16* | (2006.01) |

(Continued)

(52) U.S. Cl.
CPC ............ *H02J 9/005* (2013.01); *G06F 1/1626* (2013.01); *G06F 1/1632* (2013.01); *G06F 1/263* (2013.01); *G06F 1/266* (2013.01); *G06F 1/3206* (2013.01); *G06F 1/3212* (2013.01);
(Continued)

(58) Field of Classification Search
CPC ...... G06F 1/3206; G06F 1/3212; G06F 1/263; G06F 1/266; H02J 9/005
See application file for complete search history.

(56) References Cited

U.S. PATENT DOCUMENTS

| | | | | |
|---|---|---|---|---|
| 4,908,523 | A | * | 3/1990 | Snowden .................. G06F 1/30 307/18 |
| 6,516,374 | B1 | * | 2/2003 | Kinoshita ............. G06F 1/1632 710/302 |

(Continued)

FOREIGN PATENT DOCUMENTS

| | | |
|---|---|---|
| JP | H04-302314 A | 10/1992 |
| JP | H10-320081 A | 12/1998 |
| JP | 2003-143836 A | 5/2003 |

*Primary Examiner* — Stefan Stoynov
(74) *Attorney, Agent, or Firm* — Foley & Lardner LLP

(57) ABSTRACT

According to one embodiment, a system includes an electronic apparatus and an extension device detachable from and attachable to the apparatus. The extension device includes a first battery. The apparatus includes a second battery, a power supply circuit configured to generate operation power of the apparatus with power from a power supply source, a switching circuit configured to switch the power supply source to one battery of the first battery and the second battery, when the power supply source is an other battery of the first battery and the second battery and a switching signal is input, and a power supply controller configured to output the switching signal to the switching circuit after exerting control for reducing power consumption of the apparatus.

6 Claims, 9 Drawing Sheets

(51) Int. Cl.
  *G06F 3/02* (2006.01)
  *G06F 3/023* (2006.01)

(52) U.S. Cl.
  CPC .......... *G06F 3/0202* (2013.01); *G06F 3/0231* (2013.01); *H02J 1/00* (2013.01); *Y02B 60/1292* (2013.01)

(56) References Cited

U.S. PATENT DOCUMENTS

2003/0011247 A1    1/2003   Kajiwara et al.
2004/0210406 A1*   10/2004   Bui ..................... G06F 1/263
                                                           702/63

* cited by examiner

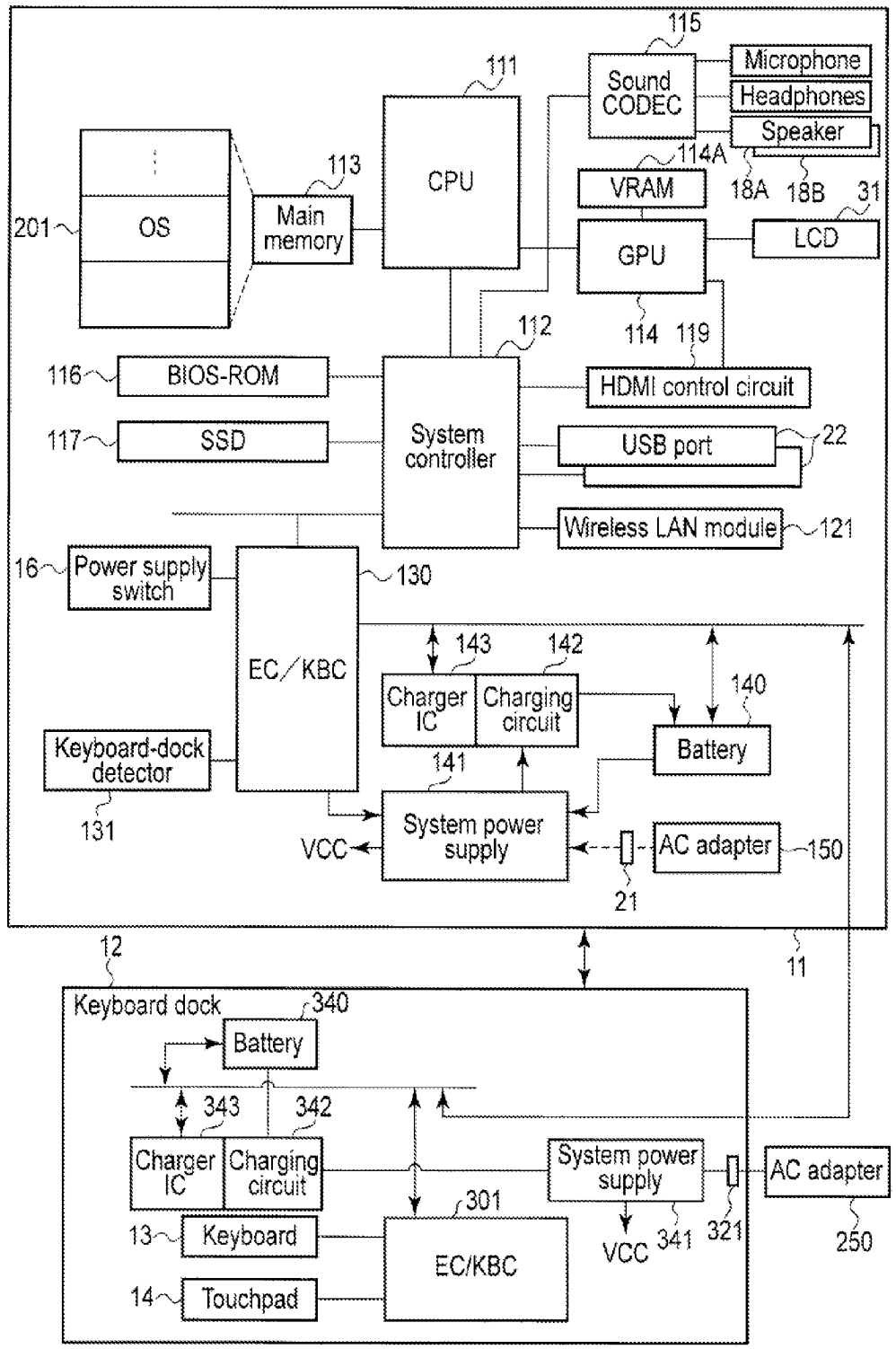
F I G. 2

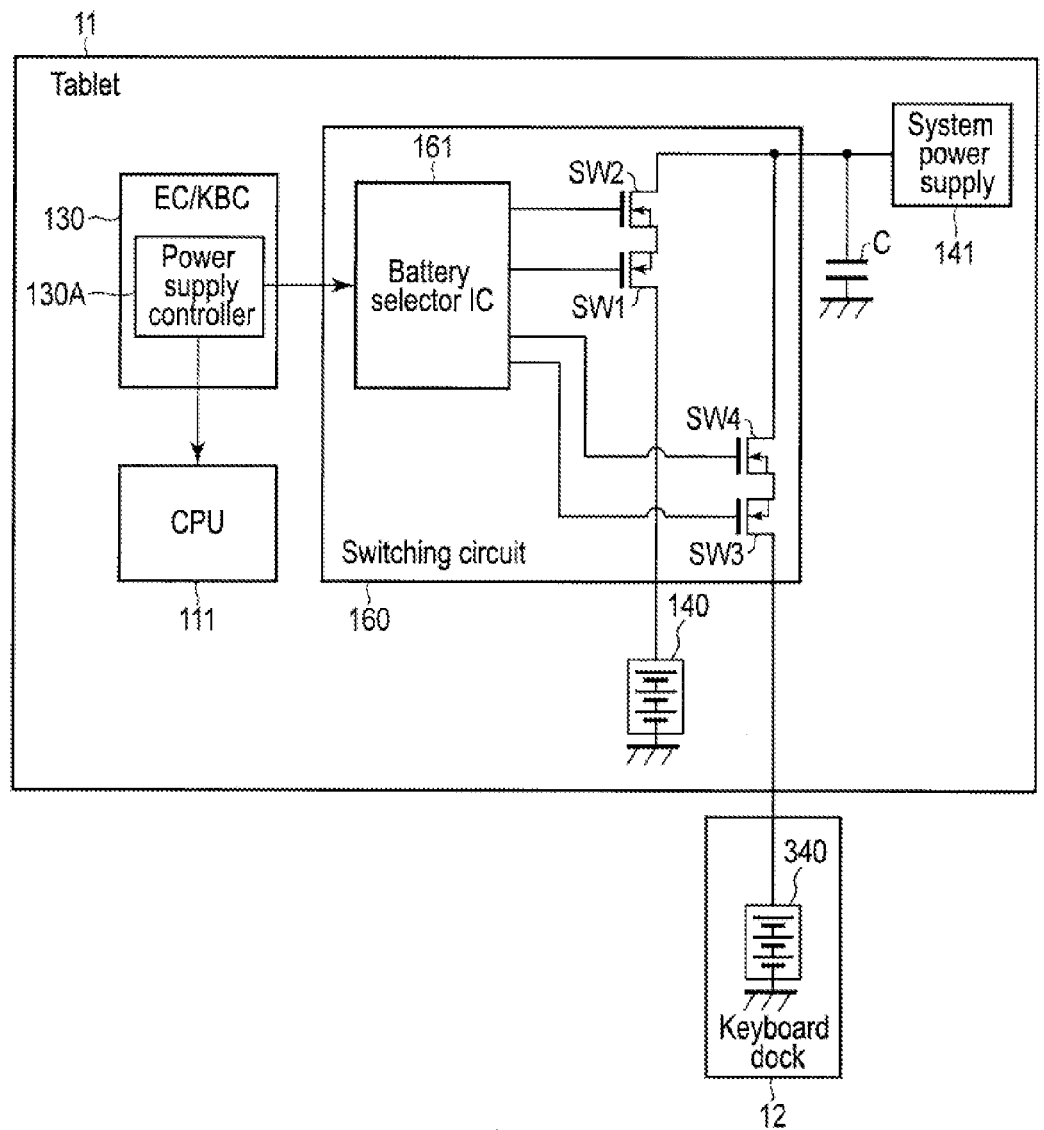
F I G. 3

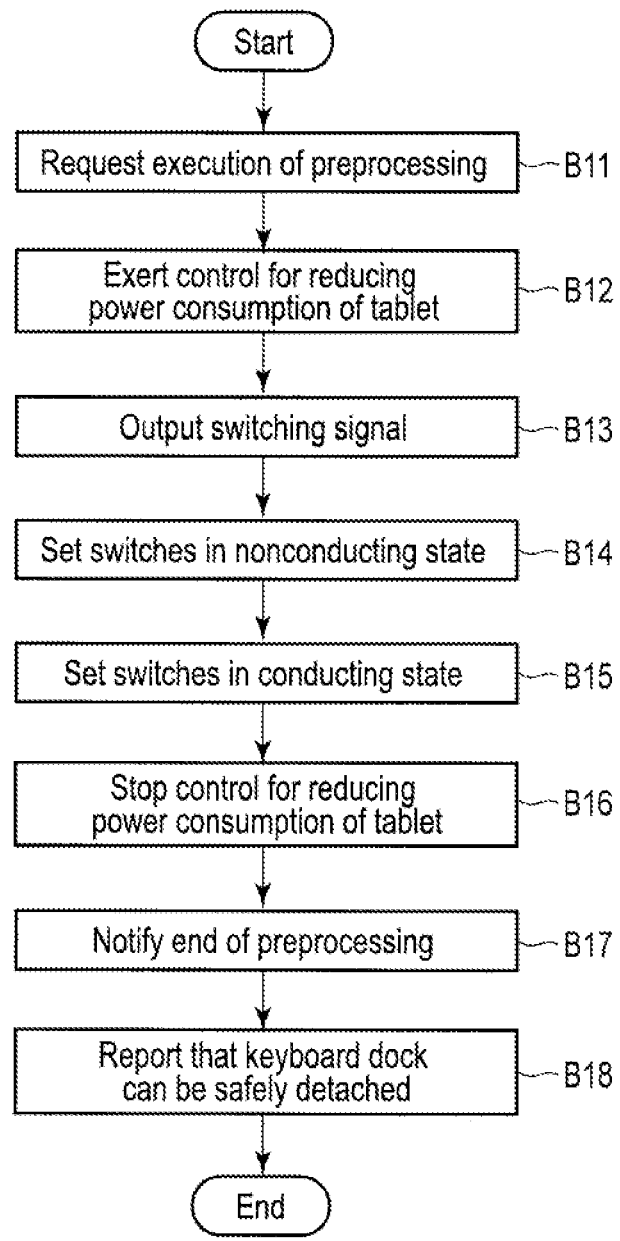
F I G. 4

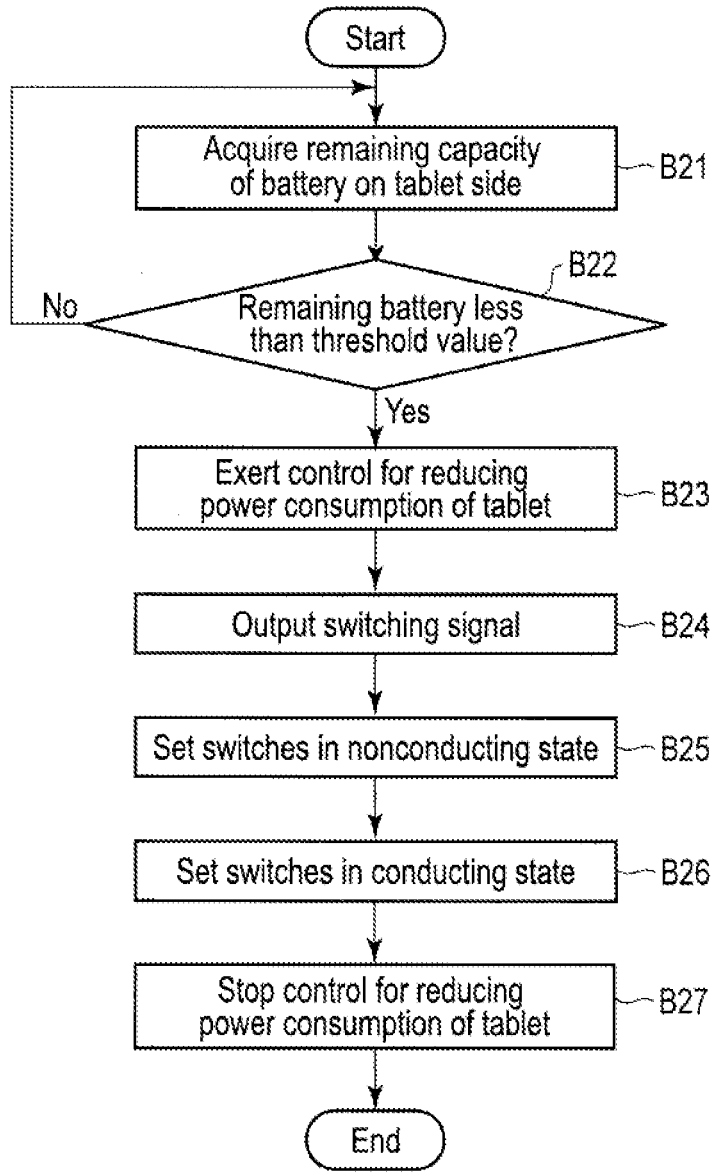
F I G. 5

SWITCHING THE POWER SUPPLY SOURCE OF SYSTEM TO ONE OF A FIRST BATTERY IN ELECTRONIC APPARATUS AND A SECOND BATTERY IN EXTENSION DETACHABLE AND ATTACHABLE TO THE APPARATUS

CROSS-REFERENCE TO RELATED APPLICATIONS

This application claims the benefit of U.S. Provisional Application No. 62/094,755, filed Dec. 19, 2014, the entire contents of which are incorporated herein by reference.

FIELD

Embodiments described herein relate generally to a system in which an electronic apparatus and an extension device are each provided with a battery.

BACKGROUND

In recent years, two-in-one PCs which can be used in the two forms of a notebook personal computer (PC) and a tablet have been sold. The two-in-one PCs include a detachable two-in-one PC system in which a housing including a display is attachable to and detachable from a housing including a keyboard. Main components such as a central processing unit (CPU) are provided in the housing including the display.

In some detachable two-in-one PCs, a housing including a display and a housing including a keyboard are each provided with a battery. When a housing including a display and a housing including a keyboard are each provided with a battery, the two batteries can be used in a switching manner. In general, a large-capacitance capacitor needs to be provided to prevent a decrease in a power supply voltage supplied to information equipment when a battery which supplies power to a PC is switched at the time of a high load.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary block diagram showing a configuration of the system according to the embodiment;

FIG. 3 is an exemplary block diagram showing a configuration for switching a power supply source;

FIG. 4 is an exemplary flowchart showing a procedure of switching the power supply source when preparation for detachment of a keyboard dock is requested from an operating system;

FIG. 5 is an exemplary flowchart showing a procedure of switching the power supply source in accordance with a remaining capacity of a battery used as the power supply source;

DETAILED DESCRIPTION

In general, according to one embodiment, a system includes an electronic apparatus and an extension device detachable from and attachable to the electronic apparatus. The extension device includes a first battery. The electronic apparatus includes a second battery, a power supply circuit configured to generate operation power of the electronic apparatus with power from a power supply source, a switching circuit configured to switch the power supply source to one battery of the first battery and the second battery, when the power supply source is an other battery of the first battery and the second battery and a switching signal is input, and a power supply controller configured to output the switching signal, to the switching circuit after exerting control for reducing power consumption of the apparatus.

Various embodiments will be described hereinafter with reference to the accompanying drawings.

Figure 1:
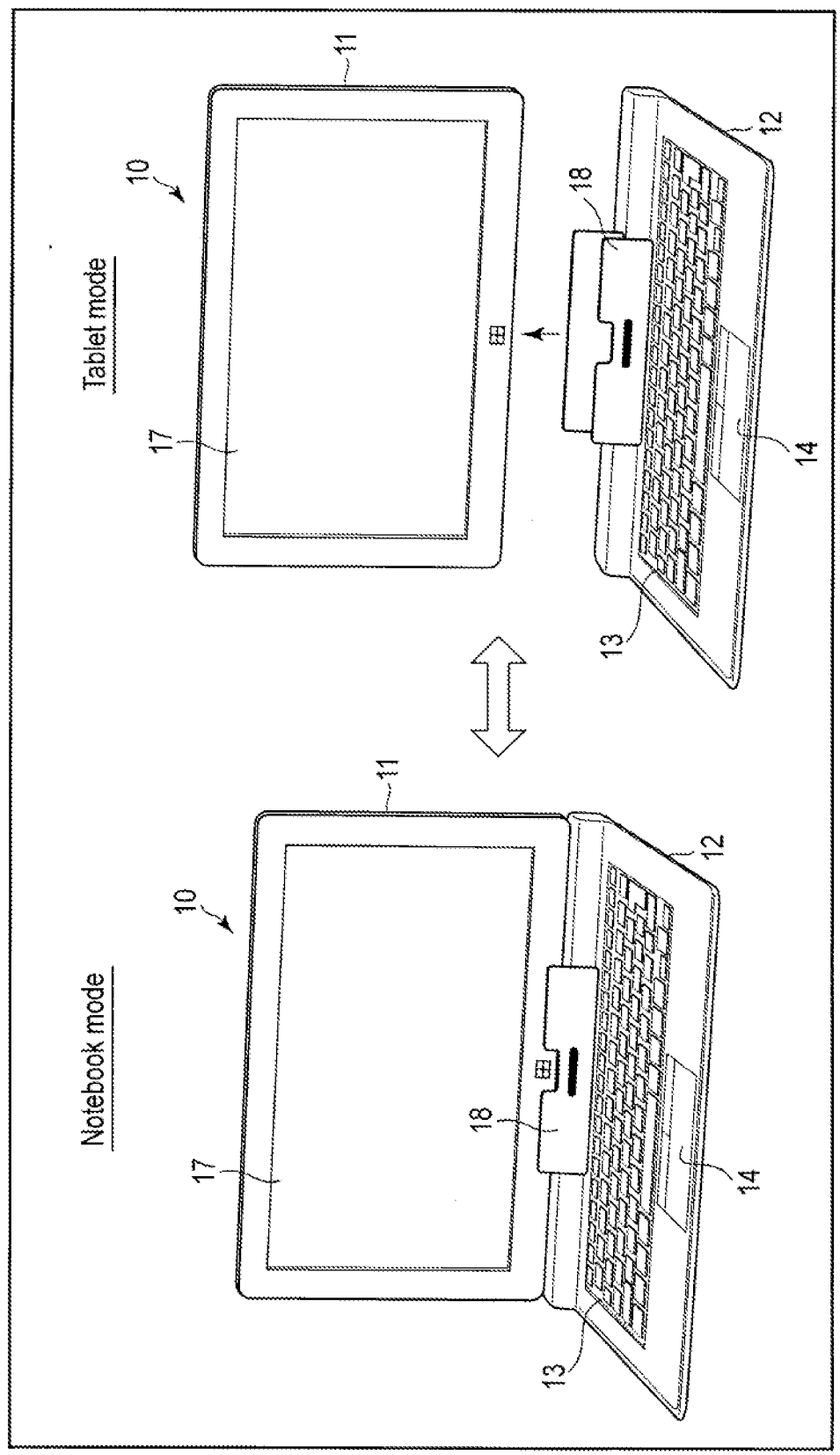
FIG. 1 is an exemplary perspective illustration showing an outside of a system according to an embodiment.

FIG. 1 is an illustration showing an outside corresponding to each of a notebook mode and a tablet mode of a system including an electronic apparatus and an extension device according to one embodiment. The system is implemented as, for example, a two-in-one personal computer (PC) system 10. The two-in-one PC system 10 is used in a style corresponding to the notebook mode shown in the left part of FIG. 1 or the tablet mode shown in the right part of FIG. 1.

The two-in-one PC system 10 includes a keyboard dock 12 and a tablet 11. The keyboard dock 12 includes a thin rectangular housing accommodating a keyboard, a battery, etc. On a top surface of the keyboard dock 12, a keyboard 13 and a touchpad 14 which is a pointing device are disposed. The touchpad 14 is disposed in a palm rest area on the top surface of the keyboard dock 12.

On a back side of the keyboard dock 12, a hinge 18 is provided. The tablet 11 is detachable from and attachable to the hinge 18 (the keyboard dock 12), In the tablet mode, the tablet 11 is detached from the keyboard dock 12 while being used.

On a front surface of the tablet 11, that is, a display surface of the tablet 11, a display 17 is disposed. The display 17 is implemented as a touchscreen display which can detect a position of a pen or a finger on a screen of the display 17.

In the notebook mode, the two-in-one PC system 10 is used mainly in the state of being placed on a horizontal plane, for example, a desk. A user operates mainly the keyboard 13 as in a normal notebook computer.

On the other hand, in the tablet mode, the tablet 11 is used mainly in the state of being held by one hand or both hands of the user. The user, for example, holds the two-in-one PC system 10 in one hand, and performs a touch operation on the display 17 by the other hand.

FIG. 2 shows a system configuration of the two-in-one PC system 10 in the embodiment. The tablet 11 of the two-in-one PC system 10 includes a central processing unit (CPU) 111, a system controller 112, a main memory 113, a graphics processing unit (GPU) 114, a sound CODEC 115, a BIOS-ROM 116, a solid-state drive (SSD) 117, a wireless LAN module 121, an embedded controller/keyboard controller IC (EC/KBC) 130, a keyboard-dock detector 131, a charging circuit 142, a charger IC 143, etc.

The CPU 111 is a processor which controls operation of each component of the two-in-one PC system 10. The CPU 111 executes various programs loaded from the HDD 117 to the main memory 113. The programs include an operating system (OS) 201 and various application programs.

In addition, the CPU 111 also executes a Basic Input/Output System (BIOS) stored in the BIOS-ROM 116, which is a nonvolatile memory. The BIOS is a system program for hardware control.

The GPU 114 is a display controller which controls the LCD 17 used as a display monitor of the two-in-one PC system 10. The GPU 114 generates a display signal (LVDS signal) to be supplied to the LCD 17 from display data stored in a video memory (VRAM) 114A. Moreover, the GPU 114 can also generate an HDMI video signal from display data. An HDMI control circuit 119 is an interface for sending an HDMI video signal and a digital audio signal to an external display through, for example, an HDMI output terminal provided on the keyboard dock 12.

The system controller 112 is a bridge device which connects the CPU 111 and each component. The system controller 112 contains a serial ATA controller for controlling the solid-state drive (SSD) 117.

Further, to the system controller 112, devices such as a USB port 22 and the wireless LAN module 121 are connected.

Moreover, the system controller 112 communicates with each device connected through a bus.

The EC/KBC 130 is connected to the system controller 112 through a bus. In addition, the EC/KBC 130, the charger IC 143, and a battery 140 are connected to each other through a serial bus.

The EC/KBC 130 is a power management controller for performing power management of the tablet 11, and is implemented as, for example, a single-chip microcomputer containing a keyboard controller which controls a keyboard (KB), a touchpad, etc. The EC/KBC 130 has a function of powering on or powering off the two-in-one PC system 10 in response to the user's operation of a power supply switch 16. The control of powering on or powering off the two-in-one PC system 10 is executed over a system power supply 141 by the EC/KBC 130.

The keyboard-dock detector 131 detects whether the tablet 11 is attached to the keyboard dock 12. The keyboard-dock detector 131 notifies the EC/KBC 130 of a detection result.

The charger IC 143 is an IC which controls the charging circuit 142 under the control of the EC/KBC 130. The EC/KBC 130, the charger IC 143, and the system power supply 141 operate on power from the battery 140 or an AC adapter 150 connected to a power supply port 21 even when the two-in-one PC system 10 is powered off.

The system, power supply 141 generates power (operation power) to be supplied to each component with power from any of the battery 140, the AC adapter 150 connected to the tablet 11 as an external power supply, the battery 340 of the keyboard dock 12, and an AC adapter 250 on the keyboard dock 12 side. In addition, the system power supply 141 supplies power with which the battery 140 is charged by the charging circuit 142.

The charging circuit 142 charges the battery 140 with power supplied through the system power supply 141 under the control of the charger IC 143.

The keyboard dock 12 includes the keyboard 13, the touchpad 14, an EC/KBC 301, the battery 340, a system power supply 341, a charging circuit 342, a charger IC 343, etc.

The EC/KBC 301 is a power management controller for performing power management of the keyboard dock 12, and is implemented as, for example, a single-chip microcomputer containing a keyboard controller which controls the keyboard (KB) 13, the touchpad 14, etc.

The charger IC 343 is an IC which controls the charging circuit 342 under the control of the EC/KBC 301.

The system power supply 341 generates power (operation power) to be supplied to each component and the two-in-one PC system 10 with power from the battery 340 or power supplied from the AC adapter 250 connected as an external power supply through a power supply port 321. In addition, the system power supply 341 supplies power with which the battery 340 is charged by the charging circuit 342.

The charging circuit 342 charges the battery 340 with DC power under the control of the charger IC 343.

When the keyboard dock 12 is attached to the tablet 11, the AC adapters 150 and 250 are not connected, and a power supply source of the system power supply 141 is one battery of the battery 140 and the battery 340, the tablet 11 can switch the power supply source from one battery to the other battery of the battery 140 and the battery 340.

FIG. 3 is a block diagram showing a configuration for switching the power supply source.

The tablet 11 includes the CPU 111, the EC/KBC 130, the battery 140, a capacitor C, the system power supply 141, a switching circuit 160, etc. The keyboard dock 12 includes the battery 340, etc. The EC/KBC 130 includes a power supply controller 130A, etc.

The switching circuit 160 switches the power supply source (battery) connected to the system power supply 141. For example, when the AC adapter ISO and the AC adapter 250 do not supply power to the system power supply 141, the switching circuit 160 supplies one of power supplied from the battery 140 and power supplied from the battery 340 to the system power-supply 141 by switching the power supply source.

The switching circuit 160 includes a battery selector IC 161, a switch SW1, a switch SW2, a switch SW3, a switch SW4, etc.

The switch SW1 and the switch SW2 include an n-channel metal-oxide-semiconductor field-effect transistor (nMOSFET), respectively. In addition, the switch SW3 and the switch SW4 include a p-channel metal-oxide-semiconductor field-effect transistor (pMOSFET), respectively.

The drain of the switch (nMOSFET) SW1 is electrically connected to the battery 140. The source of the switch (nMOSFET) SW1 is electrically connected to the source of the switch (nMOSFET) SW2. The drain of the switch (nMOSFET) SW2 is electrically connected to one end of the system power supply 141. The gates of the switch (nMOSFET) SW1 and the switch (nMOSFET) SW2 are connected to the battery selector IC 161.

The drain of the switch (pMOSFET) SW3 is electrically connected to the battery 340. The source of the switch (pMOSFET) SW3 is electrically connected to the source of the switch (pMOSFET) SW4. The drain of the switch (pMOSFET) SW4 is electrically connected to the system power supply 141. The gates of the switch (pMOSFET) SW3 and the switch (pMOSFET) SW4 are connected to the battery selector IC 161.

One end of the capacitor C is electrically connected to the drain of the switch (nMOSFET) SW2, the drain of the switch (pMOSFET) SW4, and the system power supply 141.

When the power supply source of the system power supply 141 is one of the battery 140 and the battery 340 and a switching signal is input to the switching circuit 160, the power supply source is switched from the one battery to the other battery of the battery 140 and the battery 340 by switching the power supply source.

When the power supply source is the battery 140, the battery selector IC 161 supplies high signals to the gates of the switch (nMOSFET) SW1 and the switch (nMOSFET) SW2, and supplies low signals to the gates of the switch (pMOSFET) SW3 and the switch (pMOSFET) SW4. As a result, the switch SW1 and the switch SW2 are set in a conducting state, and the switch SW3 and the switch SW4 are set in a nonconducting state, whereby the battery 140 can supply power to the system power supply 141.

When the power supply source is the battery 140 and a switching signal is input, the battery selector IC 161 sets the switch SW1 and the switch SW2 in a nonconducting state, and then sets the switch SW3 and the switch SW4 in a conducting state. As a result, the battery 340 can supply power to the system power supply 141.

When the power supply source is the battery 340, the battery selector IC 161 supplies low signals to the gates of the switch (nMOSFET) SW1 and the switch (nMOSFET) SW2, and supplies high signals to the gates of the switch (pMOSFET) SW3 and the switch (pMOSFET) SW4. As a result, the switch SW1 and the switch SW2 are set in a nonconducting state, and the switch SW3 and the switch SW4 are set in a conducting state, whereby the battery 340 can supply power to the system power supply 141.

When the power supply source is the battery 140 and a switching signal is input, the battery selector IC 161 sets the switch SW3 and the switch SW4 in a nonconducting state, and then sets the switch SW1 and the switch SW2 in a conducting state. As a result, the battery 140 can supply power to the system power supply 141.

For example, when the preparation for detachment of the keyboard dock 12 is requested from the operating system 201, the power supply controller 130A outputs a switching signal to the battery selector IC 161 of the switching circuit 160. Moreover, for example, when a remaining capacity of a battery used as the power supply source is less than a threshold value, the power supply controller 130A outputs a switching signal to the battery selector IC 161 of the switching circuit 160.

In addition, the power supply controller 130A outputs a switching signal to the battery selector IC 161 of the switching circuit 160 after exerting control for reducing power consumption of the tablet 11. The control for reducing power consumption of the tablet 11 includes making a PROCHOT# signal output to the CPU 111 high for reducing the frequency of the CPU 111 clock. In addition, the control for reducing power consumption of the tablet 11 may include reducing the frequency of the GPU 114 clock.

After outputting a switching signal to the battery selector IC 161, the power supply controller 130A does not exert control for reducing power consumption of the tablet 11. For example, the power supply controller 130A makes a PROCHOT# signal output to the CPU 111 low.

The capacitor C is provided to prevent a decrease in a voltage of power supplied to each component of the tablet 11 from the system power supply 141, when the power supply source from which power is supplied to the system power supply 141 is switched at the time of a system high load.

That is, the system power supply 141 operates on power accumulated in the capacitor C during a period from when the supply from one power supply source is stopped until the supply from the other power supply source is started.

In the embodiment, since the control for reducing power consumption is exerted when the battery used as the power supply source is switched, the power consumption of the tablet 11 is suppressed. Therefore, even if the capacitance of the capacitor C is small, the system of the tablet 11 does not end abnormally.

A procedure of switching the power supply source when the preparation for detachment of the keyboard dock 12 is requested from the operating system 201 will be hereinafter described. FIG. 4 is a flowchart showing the procedure of switching the power supply source when the preparation for detachment of the keyboard dock 12 is requested from the operating system 201. In the following description, it is assumed that the battery 140 is used as the power supply source.

When the operating system 201 is notified by the user's operation that the keyboard dock 12 will be detached, the operating system 201 requests the power supply controller 130A to execute preprocessing for safely detaching the keyboard dock 12 (block B11). The user's operation for notifying the operating system 201 that the keyboard dock 12 will be detached is, for example, a simultaneous operation of a function key and an E key of the keyboard 13.

The power supply controller 130A exerts control for reducing power consumption of the tablet 11 (block B12). The power supply controller 130A outputs a switching signal to the battery selector IC 161 (block B13).

The battery selector IC 161 sets switches which are presently in a conducting state (a pair of the switches SW1 and SW2 or a pair of the switches SW3 and SW4) in a nonconducting state (block B14). The battery selector IC 161 sets switches other than those set in a nonconducting state in block B14 (a pair of the switches SW3 and SW4 or a pair of the switches SW1 and SW2) in a conducting state (block B15).

When a predetermined time has passed since a switching signal was output, the power supply controller 130A stops control for reducing power consumption of the tablet 11 (block 216). The predetermined time is, for example, a time obtained by adding a certain time to a time from when the switching signal is output until the power supply source is switched.

The power supply controller 130A notifies the operating system 201 that the preprocessing for safely detaching the keyboard dock 12 has been ended (block B17). The operating system 201 reports that the keyboard dock 12 can be safely detached from the tablet 11 (block B18).

A procedure of switching the power supply source in accordance with a remaining capacity of a battery used as the power supply source will be hereinafter described. FIG. 5 is a flowchart showing the procedure of switching the power supply source in accordance with the remaining capacity of the battery used as the power supply source. In the following description, it is assumed that the battery 140 is used as the power supply source.

The power supply controller 130A acquires a remaining capacity of the battery 140 (block B21). The power supply controller 130A determines whether the acquired remaining battery is less than a threshold value (block B22). When it is determined that the remaining capacity is not less than the threshold value (No in block B22), the power supply controller 130A sequentially performs the processes in and after block B21 after a predetermined time.

When it is determined that the remaining capacity is less than the threshold value (Yes in block B22), the power supply controller 130A exerts control for reducing power consumption of the tablet 11 (block B23). The power supply controller 130A outputs a switching signal to the battery selector IC 161 (block B24).

The battery selector IC 161 sets the switches SW1 and SW2 which are presently in a conducting state in a nonconducting state (block B24). The battery selector IC 161 sets the switches SW3 and SW4 in a conducting state (block B26).

When a predetermined time has passed since a switching signal was output, the power supply controller 130A does not exert control for reducing power consumption of the tablet 11 (block B27). The predetermined time is, for example, a time obtained by adding a certain time to a time from when the switching signal is output until the power supply source is switched.

By exerting control for reducing power consumption of the tablet 11 before switching the power supply source, a battery used as the power supply source can be safely switched, while the capacitance of a capacitor necessary for provision against a decrease in power supply voltage is reduced.

In the above-described embodiment, the control for reducing power consumption of the tablet 11 is exerted by the power supply controller 130A. The power supply controller 130A is generally comprised of a processor which executes firmware. Depending on the throughput speed of the processor, a period of a low power mode, that is, a period in which system performance is low, is long, when the power supply source is switched from one battery to the other battery. Thus, the user may make a complaint.

Therefore, the period of the low power mode of the system may be shortened by giving a low power mode transition signal to the battery selector IC 161 and making the transition from the low power mode to a normal mode by hardware.

A capacitor necessary for provision against a decrease in a power supply voltage at the time of switching a battery can be minimized by exerting control for reducing power consumption of the system, before switching the power supply source.

[Modification]

According to the above-described structure, the case where a battery used as the power supply source is switched after normal processing for detaching the keyboard dock 12 from the tablet 11 is executed can be covered. However, the system of the tablet 11 may end abnormally, when the keyboard dock 12 is suddenly detached from the tablet 11 in the state where the battery 340 on the keyboard dock 12 side is used.

Figure 6:
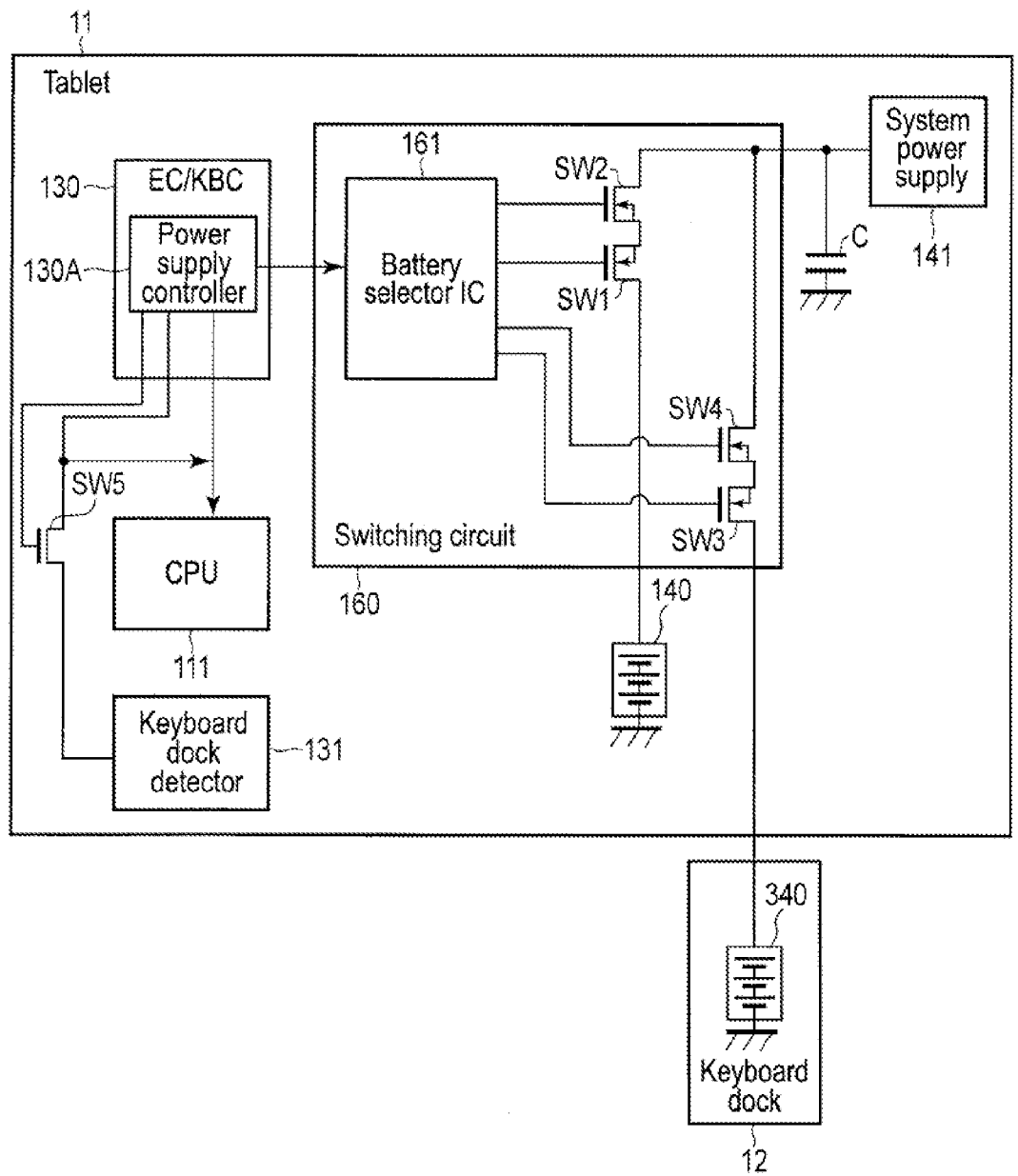
FIG. 6 is an exemplary block diagram shoving a structure in which a power supply path can be safely switched when the keyboard dock is suddenly detached from a tablet.

FIG. 6 is a block diagram showing a structure in which a battery used as the power supply source can be safely switched when the keyboard dock 12 is suddenly detached from the tablet 11.

As shown in FIG. 6, the keyboard-dock detector 131 and a switch SW5 are further provided. The keyboard-dock detector 131 monitors a connection state between the tablet 11 and the keyboard dock 12, and outputs a dock connection detection signal according to a monitoring result. By connecting a dock connection detection signal line to which the dock connection detection signal is supplied to a PROCHOT# signal line, the CPU 111 promptly transitions to a low power mode when the keyboard dock 12 is about to be detached. For example, when the dock connection detection signal is high, it indicates that the keyboard dock 12 is not connected, and when the dock connection detection signal is low, it indicates that the keyboard dock 12 is connected.

Figure 7:
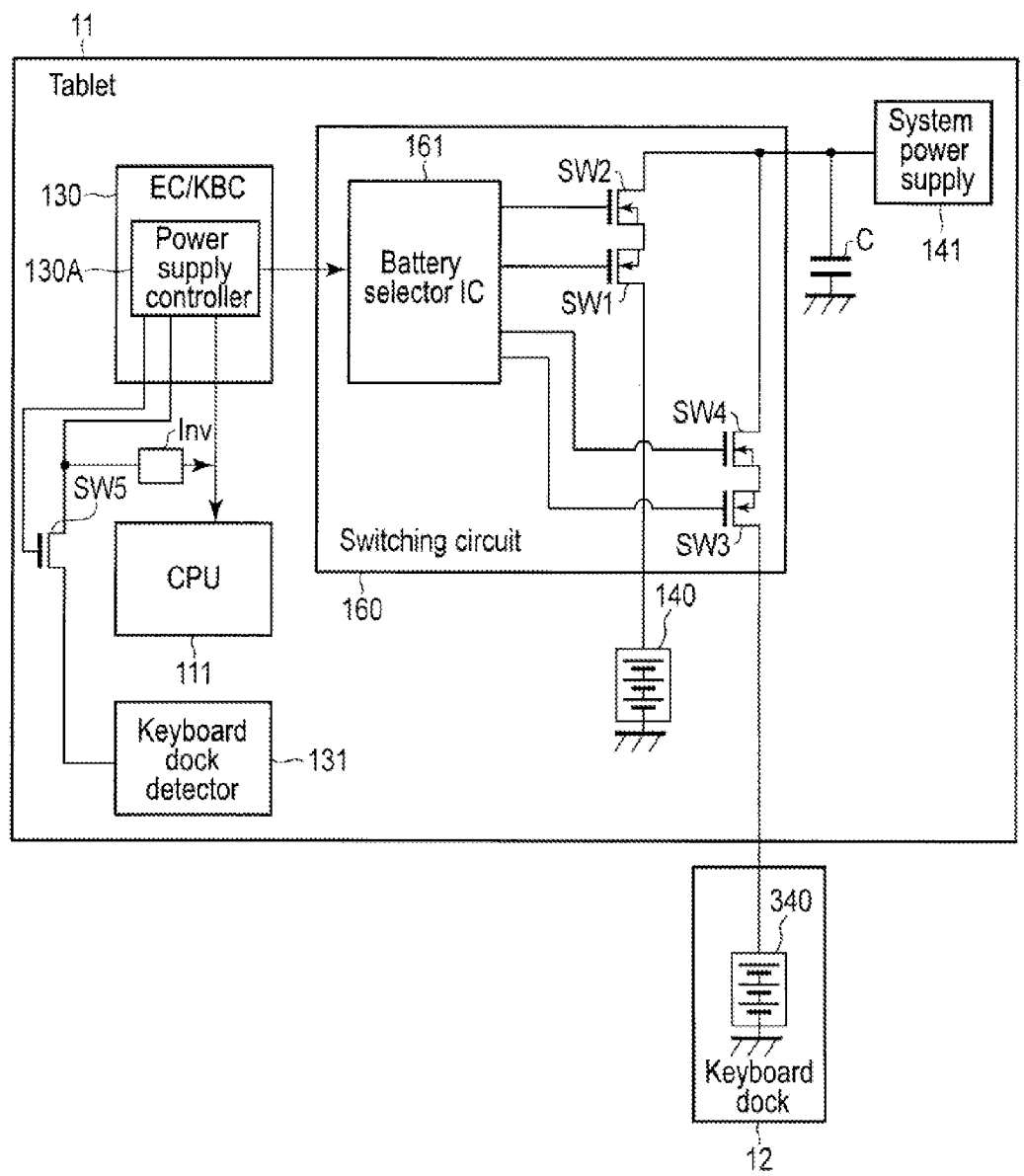
FIG. 7 is an exemplary block diagram showing a structure in which the power supply path can be safely switched when the keyboard dock is suddenly detached from the tablet.

For example, as shown in FIG. 7, an inverter Inv may be provided in the middle of the dock connection detection signal line connected to the PROCHOT# signal line to indicate that the keyboard dock 12 is connected when the dock connection detection signal is high, and to indicate that the keyboard dock 12 is not connected when the dock connection detection signal is low.

The power supply controller 130A sets the switch SW5 in a nonconducting state when a predetermined time has passed since the dock connection detection signal started to indicate that the keyboard dock 12 is detached. Since the switch SW5 is set in a nonconducting state, the PROCHOT# signal line is not electrically connected to the dock connection detection signal line. As a result, the CPU 111 can be switched from a low frequency mode to a normal operation mode, and thus, the power supply controller 130A can prohibit the exertion of control for reducing power consumption.

When the keyboard-dock detector 131 detects that the keyboard dock 12 is attached after the switch SW5 is set in a nonconducting state, the power supply controller 130A sets the switch SW5 in a conducting state.

Figure 8:
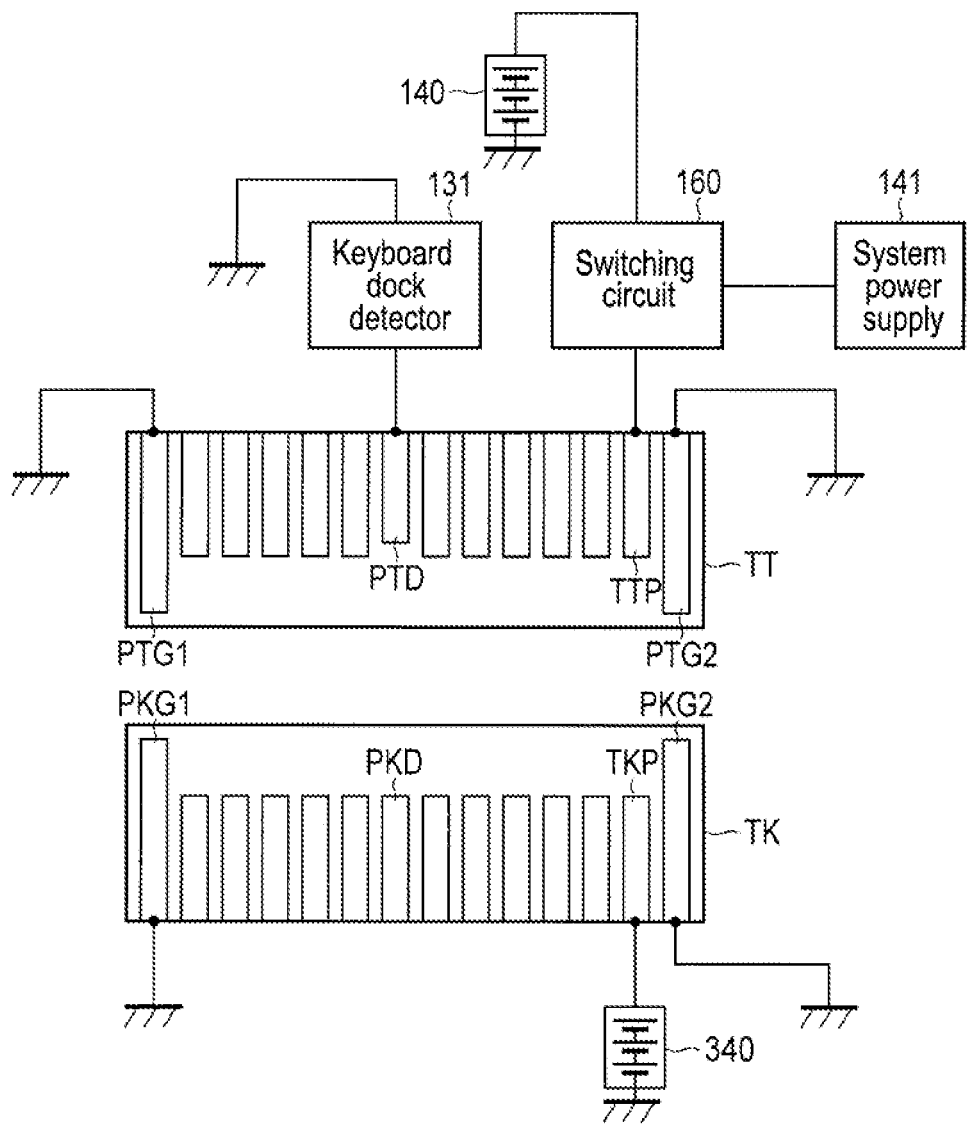
FIG. 8 is an exemplary illustration showing a connection terminal including a dock detection pin and a power supply pin provided on the tablet side, and a connection terminal provided on the keyboard dock side.

To realize this function, a dock detection pin for detecting connection of the keyboard dock 12 needs to be extracted earlier than a power supply pin to which power is supplied from the battery 340. Thus, the dock detection pin is preferably shorter than the power supply pin. FIG. 8 is an illustration showing a connection terminal TT including a dock detection pin and a power supply pin provided on the tablet 11 side and a connection terminal TK provided on the keyboard dock 12 side. Each pin provided on the connection terminal TT on the tablet 11 side and each pin provided on the connection terminal TK on the keyboard dock 12 side are electrically connected when the tablet 11 is attached to the keyboard dock 12.

The connection terminal TT includes a dock detection pin PTD, a power supply pin TTP, ground pins PTG1 and PTG2, etc. The dock detection pin PTD is electrically connected to the keyboard-dock detector 131. The power supply pin TTP is electrically connected to the switching circuit 160. The ground pins PTG1 and PTG2 are connected to ground.

The connection terminal TK includes s dock detection pin PKD, a power supply pin TKP, ground pins PKG1 and PKG2, etc. The power supply pin TKP is electrically connected to the battery 340. The ground pins PKG1 and PKG2 are electrically connected to ground.

The dock detection pin PTD is shorter than the power supply pin TTP. For example, when the tablet 11 is extracted from the keyboard dock 12 with a speed of 2 to 3 m/s, it is sufficient that the dock detection pin PTD is approximately 0.05 mm shorter than the power supply pin TTP. The dock detection pin PKD and the power supply pin TKP are substantially the same in length.

Figure 9:
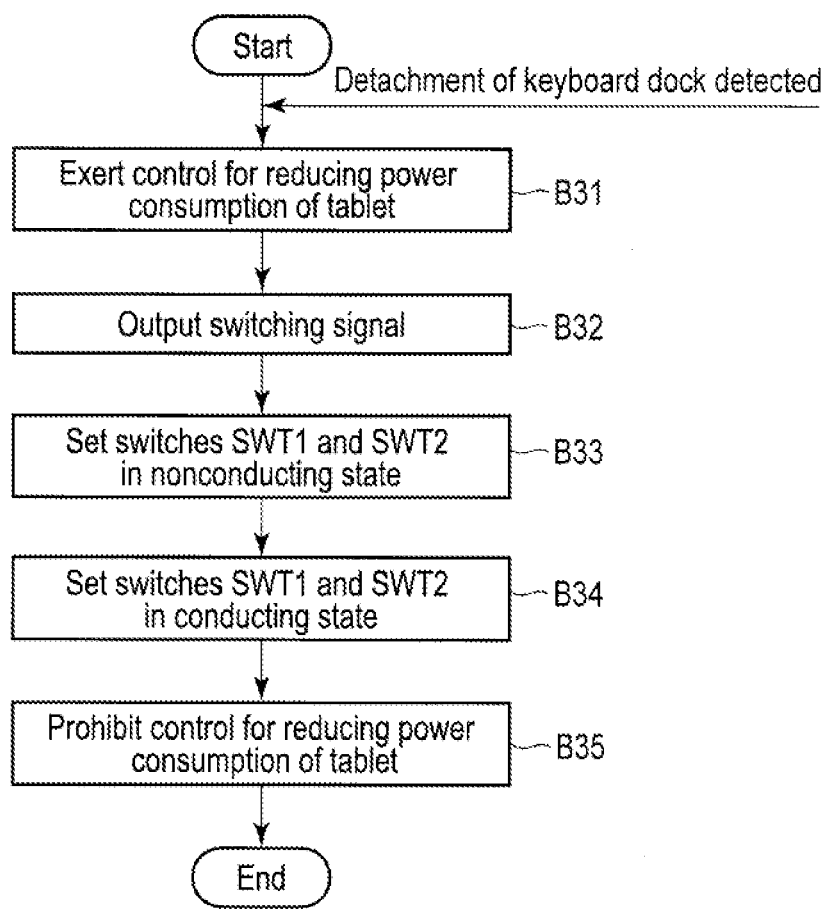
FIG. 9 is an exemplary flowchart showing a procedure of switching the power supply source when the battery on the keyboard dock side is the power supply source and the detachment of the keyboard dock is detected.

A procedure of switching the power supply source when the battery 340 on the keyboard dock 12 side is the power supply source and the detachment of the keyboard dock 12 is detected will be hereinafter described. FIG. 9 is a flowchart showing the procedure of switching the power supply source when the battery 340 on the keyboard dock 12 side is the power supply source and the detachment of the keyboard dock 12 is detected.

When the keyboard-dock detector 131 detects the detachment of the keyboard dock 12, the keyboard-dock detector 131 exerts control for reducing power consumption of the tablet 11 (block B31). For example, the CPU 111 is set in a low frequency mode by making a signal supplied from the dock connection detection signal line to the PROCHOT# signal line high.

When the keyboard-dock detector 131 detects the detachment of the keyboard dock 12, the power supply controller 130A outputs a switching signal to the battery selector IC 161 (block B32).

The battery selector IC 161 sets the switches SW3 and SW4 which are presently in a conducting state in a nonconducting state (block B33). The battery selector IC 151 sets the switches SW1 and SW2 in a conducting state (block B34).

When a predetermined time has passed since the switching signal was output, the power supply controller 130A prohibits the exertion of control for reducing power consumption of the tablet 11 by making the switch SW5 nonconductive (block B35). The predetermined time is, for example, a time obtained by adding a certain time to a time from when the switching signal is output until the power supply source is switched.

As described above, the keyboard-dock detector 131 exerts control for reducing power consumption of the tablet 11, when the keyboard dock 12 is suddenly detached from the tablet 11, whereby the battery used as the power supply source can be safely switched.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A system comprising an electronic apparatus and an extension device detachable from and attachable to the apparatus,
wherein the device comprises a first battery, and
the apparatus comprises:
a second battery;
a power supply circuit configured to generate operation power of the apparatus with power from a power supply source;
a capacitor connected to the first battery, the second battery, and the power supply circuit, and configured to supply charge power to the power supply circuit only during a period of switching the power supply source;
a switching circuit configured to switch the power supply source to one battery of the first battery and the second battery, when the power supply source is an other battery of the first battery and the second battery and a switching signal is input; and
a power supply controller, comprising a power supply processor, configured to output the switching signal to the switching circuit after exerting control for reducing power consumption of the apparatus when a remaining capacity of one of the first battery and the second battery is less than a threshold value, and not exerting the control for reducing the power consumption of the apparatus after outputting the switching signal.

2. The system of claim 1, wherein the power supply controller is further configured to output the switching signal to the switching circuit after exerting the control for reducing the power consumption of the apparatus, when notification of preparation for detachment of the device is given.

3. The system of claim 1,
wherein the apparatus further comprises a processor, and
the power supply controller is further configured to output a signal for reducing an operating frequency of the processor to the processor as the control for reducing the power consumption of the apparatus.

4. A power supply source switching method of a system comprising an electronic apparatus and an extension device detachable from and attachable to the electronic apparatus,
wherein the device comprises a first battery,
the apparatus comprises:
a second battery;
a power supply circuit configured to generate operation power of the apparatus with power from a power supply source;
a capacitor connected to the first battery, the second battery, and the power supply circuit, and configured to supply charge power to the power supply circuit only during a period of switching the power supply source; and
a switching circuit configured to switch the power supply source to one battery of the first battery and the second battery, when the power supply source is an other battery of the first battery and the second battery and a switching signal is input, and
the method comprises:
exerting control for reducing power consumption of the apparatus when a remaining capacity of one of the first battery and the second battery is less than a threshold value;
outputting the switching signal to the switching circuit after the control; and
not exerting the control for reducing the power consumption of the apparatus after outputting the switching signal.

5. The method of claim 4, wherein the switching signal is output to the switching circuit after the control for reducing the power consumption of the apparatus is exerted, when notification of preparation for detachment of the device is given.

6. The method of claim 4,
wherein the apparatus further comprises a processor, and
the control for reducing the power consumption comprising outputting a signal for reducing an operating frequency of the processor to the processor.

* * * * *